United States Patent Office 3,773,759
Patented Nov. 20, 1973

3,773,759
1-ARYLIDENEAMINO-4-(2-OXO-3-PHENYL-3-BENZOFURYL)PIPERAZINES
John W. Cusic, Skokie, Charles R. Ellefson, Chicago, and Ernest F. Levon, Evanston, Ill., assignors to G. D. Searle & Co., Chicago, Ill.
No Drawing. Filed Aug. 21, 1972, Ser. No. 282,545
Int. Cl. C07d 51/70
U.S. Cl. 260—240 G                     6 Claims

ABSTRACT OF THE DISCLOSURE

The hydrazones which result from condensation of 1-amino-4-(2-oxo-3-phenyl - benzofuryl)piperazine with arylcarboxaldehydes have pharmacological properties, thus are anti-convulsant agents, bradykinin antagonists, prostaglandin $E_2$ antagonists, and central nervous system affective agents.

---

This invention relates to 1-arylideneamino-4-(2-oxo-3-phenyl-3-benzofuryl)piperazines which are new, unobvious, and useful chemical compounds of the formula

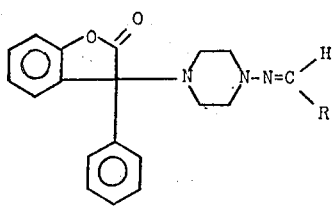

wherein R is a homocyclic or heterocyclic aromatic hydrocarbon radical. Typical homocyclic radicals are phenyl and substituted phenyl, e.g., 3,4-methylenedioxyphenyl. Representative heterocyclic radicals are pyridyl and substituted pyridyl, e.g., C-methylpyridyl.

Also encompassed by the present inventions are salts of the above compounds. Thus, the compounds indicated from non-toxic salts with a variety of inorganic and strong organic acids. That is, they form salts with sulfuric, phosphoric, hydrochloric, hydrobromic, sulfamic, citric, lactic, maleic, malic, succinic, tartaric, cinnamic, acetic, benzoic, gluconic, and related acids. These compounds are prepared according to Scheme I.

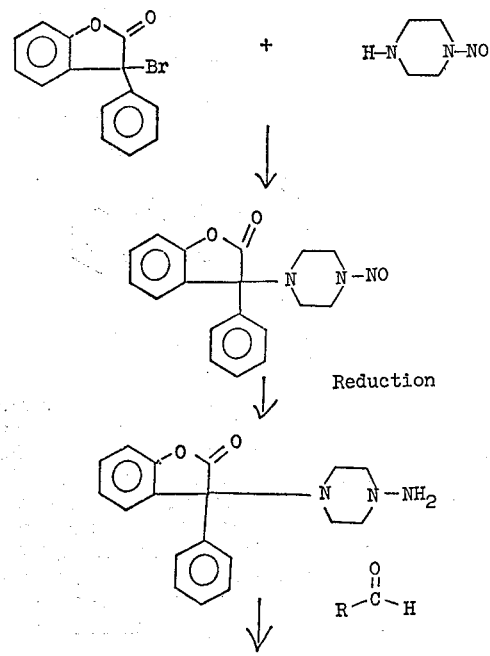

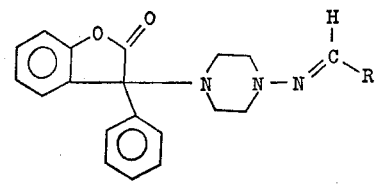

SCHEME I 3-bromo-3-phenyl - 2 - benzofuranone, which is prepared by the method of A. Bistrzycki and J. Flatau, Ber., 30 (1897), is condensed with N-nitrosopiperazine to form 1-nitroso-4-(2-oxo-3-phenyl - 3 - benzofuryl)piperazine. 1-nitroso - 4 - (2-oxo-3-phenyl - 3 - benzofuryl)piperazine is reduced to 1-amino-4-(2-oxo-phenyl-3-benzofuryl)piperazine and the latter serves as an intermediate from which hydrazones of aromatic aldehydes can be formed in aqueous acidic media. Thus, benzaldehyde is condensed with 1-amino-4-(2-oxo - 3 - phenyl - 3 - benzofuryl)piperazine in aqueous acetic acid to form 1-benzylideneamino-4-(2-oxo-3-phenyl-3-benzofuryl) piperazine.

The compounds of the present invention have pharmacological utility as anti-convulsant agents, bradykinin-antagonists prostaglandin $E_2$(PGE)-antagonists, and as central nervous system affective agents.

The anti-convulsant activity of the present compounds is evident from the results obtained by using a standard procedure adapted from that described by E. A. Swinyard et al., J. Pharmacol. and Exp. Therapeutics, 106, 319 (1952). In this procedure, 50 mg./kg. of a compound to be tested is administered intragastrically to each of 10 mice. At a specific time after the administration of the test compound (2.5 hours), each mouse is challenged with a current of 50 milliamperes, delivered via corneal electrodes, for 0.2 seconds. This current is sufficient to induce maximal electroshock seizures in 100% of control animals. A compound is rated active if the hind limb tonic extensor component of the seizure pattern is absolished in at least 20% of the animals in the group tested.

The bradykinin-antagonist properties of the compounds of the present invention are evidenced by results of the following test. Two Charles River female rats weighing 240–280 grams are treated on each of two successive days with diethylstilbesterol in order to induce a state of estrus. On the third day the animals are sacrificed and the uteri are removed. A 10 mm. section is taken from one of the uteri and suspended in a tissue bath containing 1.9 ml. of Tyrode's solution, prepared as described by Barnes and Eltherington, "Drug Dosage in Laboratory Animals," p. 261, University of California Press, Berkeley, Calif. (1964). The tissue bath is surrounded by a water jacket maintained at a constant temperature of 30° C. The concentration of bradykinin in the tissue bath is then gradually increased by successive additions of bradykinin dissolved in Tyrode's solution. The bradykinin solution concentration is defined as the pD, which is the log of the reciprocal of the concentration expressed in mg./ml. At each of the selected bradykinin concentrations, contraction of the uterus is measured in mm. by means of an E&M Physiograph used together with an Isotonic Myograph Transducer and Detecting Head. After completion of those measurements the tissue is rinsed nine times over a period of 9 minutes with fresh Tyrode's solution. The last rinse is kept in the bath and 100 mcg. of the test compound dissolved or suspended in 0.1 ml. of Tyrode's solution is injected into the bath, which consists of 1.9 ml. of Tyrode's solution. After 10 minutes the bradykinin concentration in the bath is again increased as before by the successive additions of bradykinin dissolved in Tyrode's solution. The contractions as each concentration are measured as before and are compared with the control values, i.e., those obtained in the absence of the test compound. The identical procedure is then carried out with the 10 mm. section of the uterus taken from the second animal. A compound is considered active either if it inhibits by at least 10% the maximum bradykinin-induced contraction or if it causes an increase of at least 0.3 pD unit in bradykinin concentration required to effect 50% of the maximum contractions.

The PGE$_2$ antagonist properties of the compounds of the present invention are evidenced by results of the following test. The test procedure is substantially that described by J. H. Sanner in Arch. Int. Pharmacodyn., 180(1), 46 (1969). Female albino guinea pigs weighing 200–500 g. are sacrificed by cervical dislocation and the ileum is quickly removed and placed in modified Tyrode's solution containing ½ the usual amount of magnesium ions. Segments of ileum, about 2 cm. long, are cut and mounted in a 2 or 4 ml. tissue bath containing the modified Tyrode solution. The solution is maintained at 37° and bubbled with a gaseous mixture of 95% oxygen and 5% carbon dioxide. Contractions are detected isotonically. Approximately equal submaximal contractions are obtained in preliminary trials by adjusting the dose of prostaglandin E$_2$(PGE$_2$). Two control contractions are obtained at 4.0 minute intervals. A solution or suspension of the test compound in the bathing solution is then substituted for the original modified Tyrode's solution. The test suspension is kept in constant contact with the tissue for the remainder of the experiment except for brief periods to drain the bath in preparation for rinsing with fresh test suspension. Three more contractions are elicited to each agonist in the presence of the test compound without interrupting the time sequence. The last 2 sets of treated responses are compared with the 2 sets of control responses. The first set of treated responses is not used for comparisons, being used only to maintain the timed sequence of injections during the period allowed for the tissue to become equilibrated with the antagonist. The compound is rated active if the mean of contractions produced by any agonist is reduced 75% or more by the test compound.

The central nervous system affecting capacity of the compounds of this invention is evidenced by test procedures substantially the same as those described by N. W. Dunham and T. S. Miya in J. Amer. Pharm. Assoc. (Sci. Ed.), 46, 208 (1957). To each of ten male or female mice, weighing 20–30 g., is administered intragastrically a dose of the compound to be tested. At a specific time after the administration of the test compound (2.5 hours), each mouse is placed on a rotating rod upon which untreated mice can remain indefinitely. A dose of compound is rated active if 20% of the mice are unable to remain on the rod for 1 minute.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that existing between grams and milliliters.

EXAMPLE 1

20 parts of 3-bromo-3-phenyl-2-benzofuranone is dissolved in 30 parts by volume of benzene and slowly added to 40 parts of N-nitrosopipeazine in 30 parts by volume of benzene at 25°. The mixture is stirred for 2.5 hours and diluted with 250 parts by volume of benzene. The precipitated salts are removed by filtration and the benzene filtrate is diluted with an additional 250 parts by volume of benzene. The benzene solution is washed with water and dried over anhydrous potassium carbonate. The benzene is removed by evaporation at reduced pressure and the residual solid is crystallized from ethanol. The product, 1-nitroso-4-(2-oxo-3-phenyl-benzofuryl)piperazine, melts at 112–117°.

1-nitroso-4-(2-oxo-3-phenyl-3-benzofuryl)piperazine is converted to 1-amino-4-(2-oxo-3-phenyl-3-benzofuryl)piperazine by contacting 3.0 parts of the former with 1.22 parts of zinc in 50 parts by volume of 50% aqueous acetic acid for 16 hours. This mixture is filtered to remove the excess zinc and, without purification of the resulting hydrazine, 0.99 part of benzaldehyde is added to the hydrazine/aqueous acetic acid solution. The precipitated hydrazone, 1-benzylideneamino-4-(2-oxo - 3 - phenyl-3-benzofuryl)piperazine, is extracted with 300 parts by volume of benzene. The benzene extracts are successively washed with 50% aqueous acetic acid, water, 5% aqueous potassium carbonate and water. The benzene solution is then dried over anhydrous potassium carbonate. The benzene is removed by evaporation at reduced pressure and the product is purified by chromatography on silica gel. The development of the column is initiated with 1:1 benzene-hexane solution and the pure hydrazone is eluted with 100% benzene. Crystallization from ether provides pure 1-benzylideneamino-4-(2-oxo-3-phenyl - 3 - benzofuryl)piperazine melting at 140–142°. The formula of this compound is

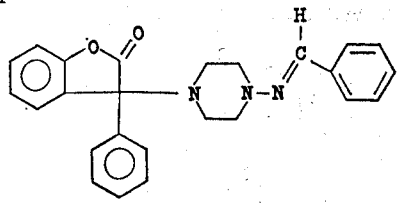

EXAMPLE 2

4.8 parts of 1-nitroso-4-(2-oxo-3-phenyl-3-benzofuryl)piperazine, prepared as described in Example 1, is reduced to the corresponding hydrazine by reacting the former compound for 5 hours with 50 parts by volume of a mixture of 50% aqueous acetic acid containing 3.0 parts of zinc dust. The mixture is filtered to remove the excess zinc and, without purification of the resulting hydrazine, 1.6 parts of 2-pyridine carboxaldehyde is added to the hydrazine/aqueous acetic acid solution. The reaction solution is cooled and made basic with 40 parts by volume of concentrated ammonium hydroxide, then is extracted with 200 parts by volume of toluene. The toluene extracts are washed with water and dried over anhydrous sodium sulfate. The toluene is removed by evaporation at reduced pressure. The crude base is chromatographed on silica. The product is eluted with 10% ethyl acetate in benzene. Crystallization from ether provides 1-(2-oxo-3-phenyl-3-benzofuryl) - 4 - (2 - pyridylmethyleneamino)piperazine, melting at 125°. The formula of this compound is

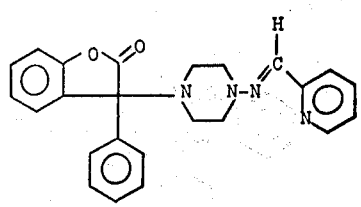

EXAMPLE 3

10 parts of 1-nitroso-4-(2-oxo-3-phenyl-3-benzofuryl)piperazine, prepared as described in Example 1, is reduced to the corresponding hydrazine by reacting the former for 5 hours with 60 parts by volume of a mixture of 50% aqueous acetic acid containing 7.0 parts of zinc dust. The mixture is filtered to remove the excess zinc and, without purification of the resulting hydrazine, 3.4 parts of 4-pyridine carboxaldehyde is added to the hydrazine/aqueous acetic solution. The reaction solution is cooled and made basic with 120 parts by volume of concentrated ammonium hydroxide, then is extracted with 250 parts by volume of toluene. The toluene extracts are washed with water and dried over anhydrous sodium sulfate. The resulting oil is taken up in ether and is precipitated as the maleate by adding 3.7 parts of maleic acid in 50 parts by volume of 1:1 ether/isopropanol. Removal of the solvents provides 1-(2-oxo-3-phenyl-3-benzofuryl)-4-(4-pyridylmethyleneamino)piperazine maleate, melting at 130–132°. The formula of this compound is

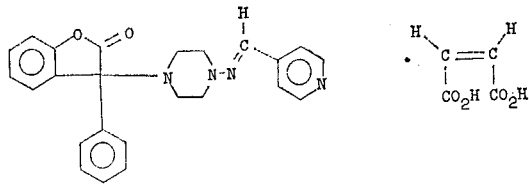

EXAMPLE 4

5.9 parts of 1-nitroso-4-(2-oxo-3-phenyl-3-benzofuryl)-piperazine, prepared as described in Example 1, is reduced to the corresponding hydrazine by reacting the former for 5 hours with 50 parts by volume of a mixture of 50% aqueous acetic acid containing 4.0 parts of zinc dust. The mixture is filtered to remove the excess zinc and, without purification of the resulting hydrazine, 2.8 parts of 3,4-methylenedioxybenzaldehyde is added to the hydrazine/aqueous acetic acid solution. The aqueous acetic acid solution is extracted with toluene and the toluene extracts are combined and successively washed with water, 5% sodium carbonate, and water. The toluene extracts are then dried over anhydrous potassium carbonate and the toluene is removed by evaporation at reduced pressure. The residual oil is chromatographed on silica gel. Development of the column is initiated with 6:4 benzene/hexane solution and the product is eluted with 2% ethyl acetate in benzene. The product is 4-(2-oxo-3-phenyl-3-benzofuryl) - 1 - (3,4 - methylenedioxybenzylideneamino)piperazine, melting at 133–140°. The formula of this compound is

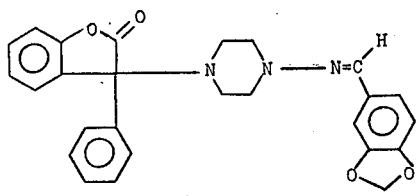

EXAMPLE 5

4.8 parts of 1-nitroso-4-(2-oxo-3-phenyl-3-benzofuryl)-piperazine, prepared as described in Example 1, is reduced to the corresponding hydrazine by reacting the former for 5 hours with 50 parts by volume of a mixture of 50% aqueous acetic acid containing 3.0 parts of zinc dust. The mixture is filtered to remove the excess zinc and, without purification of the resulting hydrazine, 1.6 parts of 6-methyl-2-pyridine carboxylaldehyde is added to the hydrazine/aqueous acetic acid solution. The reaction solution is cooled and made basic with 40 parts by volume of concentrated ammonium hydroxide, then is extracted with 200 parts by volume of toluene. The toluene extracts are washed with water and dried over anhydrous sodium sulfate. The resulting oil is taken up in ether and is precipitated as the hydrochloride by adding 2 ml. of concentrated hydrochloric acid. Removal of the ether provides 1-(2-oxo-3-phenyl-3-benzofuryl)-4-(6-methyl-2-pyridylmethyleneamino)piperazine hydrochloride. The formula of this compound is

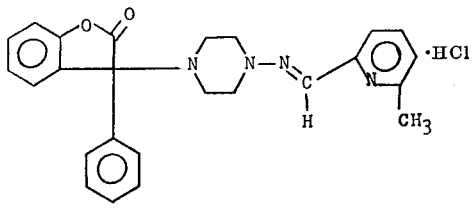

What is claimed is:
1. A compound of the formula

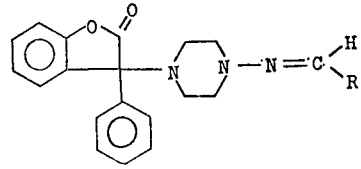

wherein R is selected from th group consisting of phenyl, 3,4-methylenedioxyphenyl, C-pyridyl, and C-methylpyridyl radicals.

2. As in claim 1, the compound which is 1-benzylideneamino-4-(2-oxo-3-phenyl-3-benzofuryl)piperazine.

3. As in claim 1, the compound which is 1-(2-oxo-3-phenyl - 3 - benzofuryl) - 4 - (2-pyridylmethyleneamino)-piperazine.

4. As in claim 1, the compound which is 1-(2-oxo-3-phenyl-3-benzofuryl) - 4 - (4 - pyridylmethyleneamino)-piperazine.

5. As in claim 1, the compound which is 1-(2-oxo-3-phenyl - 3 - benzofuryl)-4-(6-methyl-2-pyridylmethyleneamino)piperazine.

6. As in claim 1, the compound which is 4-(2-oxo-3-phenyl - 3 - benzofuryl) - 1 - (3,4-methylenedioxybenzylideneamino)piperazine.

References Cited
UNITED STATES PATENTS

| | | | |
|---|---|---|---|
| 3,178,422 | 4/1965 | Cusic et al. | 260—599 |
| 3,183,229 | 5/1965 | Cusic et al. | 260—240 G |

HENRY R. JILES, Primary Examiner

S. D. WINTERS, Assistant Examiner

U.S. Cl. X.R.

260—268 BC, 343.3; 424—250